United States Patent
Bertin et al.

(10) Patent No.: US 12,355,903 B2
(45) Date of Patent: Jul. 8, 2025

(54) METHOD AND DEVICE FOR AUTHENTICATING A USER WITH AN APPLICATION

(71) Applicant: Orange, Issy-les-Moulineaux (FR)

(72) Inventors: Emmanuel Bertin, Chatillon (FR); Julien Hatin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 240 days.

(21) Appl. No.: 17/915,736

(22) PCT Filed: Mar. 29, 2021

(86) PCT No.: PCT/FR2021/050549
§ 371 (c)(1),
(2) Date: Sep. 29, 2022

(87) PCT Pub. No.: WO2021/198606
PCT Pub. Date: Oct. 7, 2021

(65) Prior Publication Data
US 2023/0130191 A1    Apr. 27, 2023

(30) Foreign Application Priority Data
Mar. 30, 2020 (FR) ...................................... 2003133

(51) Int. Cl.
*H04L 29/00* (2006.01)
*H04L 9/00* (2022.01)
*H04L 9/32* (2006.01)

(52) U.S. Cl.
CPC .............. *H04L 9/50* (2022.05); *H04L 9/3239* (2013.01)

(58) Field of Classification Search
CPC ....... H04L 9/50; H04L 9/3239; H04L 9/3231; H04L 63/0815; H04L 63/0861; G06F 21/31; G06F 21/41; H04W 12/06
See application file for complete search history.

(56) References Cited

U.S. PATENT DOCUMENTS 11,641,278 B2 * 5/2023 Hamel .................. H04L 9/0866
726/6
2014/0040628 A1 * 2/2014 Fort ........................ H04L 63/18
713/182
(Continued)

FOREIGN PATENT DOCUMENTS

EP    2795870 B1    6/2019

OTHER PUBLICATIONS

International Search Report dated May 12, 2021 for corresponding International Application No. PCT/FR2021/050549, Mar. 29, 2021.
(Continued)

*Primary Examiner* — Ghazal B Shehni
(74) *Attorney, Agent, or Firm* — David D. Brush; Westman, Champlin & Koehler, P.A.

(57) ABSTRACT

A method for authenticating a user with at least one service application, the user being equipped with a user device that has at least one address and is able to obtain at least one authentication datum for the user. The method is implemented by the user device and includes: receiving, from the service application, a request comprising an identifier of the user; sending, to an application registered in a blockchain, a request comprising the identifier of the user; receiving, in response to the sending, a message comprising at least one first datum corresponding to a first address of the user device, the at least one first datum having been obtained on the basis of the identifier of the user; and sending, to the first address, a request to send a message comprising the at least one authentication datum for the user to an address of the service application.

14 Claims, 2 Drawing Sheets

(56) References Cited

U.S. PATENT DOCUMENTS

| | | | | |
|---|---|---|---|---|
| 2016/0380999 A1* | 12/2016 | Tevlin | ............... | H04W 12/06 |
| | | | | 713/151 |
| 2017/0208464 A1 | 7/2017 | Guertler et al. | | |
| 2019/0052467 A1* | 2/2019 | Bettger | ............... | H04L 9/0643 |
| 2019/0372834 A1* | 12/2019 | Patil | ............... | H04W 8/04 |
| 2020/0045019 A1* | 2/2020 | Huang | ............... | H04L 63/062 |
| 2021/0357927 A1* | 11/2021 | Kita | ............... | G06Q 20/38215 |
| 2022/0342951 A1* | 10/2022 | Doiron | ............... | H04L 63/067 |

OTHER PUBLICATIONS

Written Opinion of the International Searching Authority dated May 12, 2021 for corresponding International Application No. PCT/FR2021/050549, filed Mar. 29, 2021.

English translation of the Written Opinion of the International Searching Authority dated May 26, 2021 for corresponding International Application No. PCT/FR2021/050549, filed Mar. 29, 2021.

* cited by examiner

METHOD AND DEVICE FOR AUTHENTICATING A USER WITH AN APPLICATION

1. CROSS-REFERENCE TO RELATED APPLICATIONS

This application is a Section 371 National Stage Application of International Application No. PCT/FR2021/050549, filed Mar. 29, 2021, which is incorporated by reference in its entirety and published as WO 2021/198606 A1 on Oct. 7, 2021, not in English.

2. FIELD OF THE INVENTION

The invention relates to the general field of telecommunications networks, and more precisely to blockchain technology.

3. PRIOR ART

We are living in an increasingly connected world, a consequence of the increasingly advanced digitization of our traditional processes such as mail, administrative procedures, banking services, payments, etc. To access digital services and their content/functionalities, a user is often asked to identify himself using a digital identity. This digital identity is more often than not different from one service to another, meaning a multitude of identifiers for the user to memorize.

There are nowadays solutions for solving this problem, such as for example SSO (Single Sign-On) solutions, which allow the user to connect to multiple applications via a single identifier. In concrete terms, these solutions are based on delegating the authentication to identity providers or IdPs who create, manage and maintain the identity of a user on behalf of service providers. The identity providers are for example of SAML (Security Assertion Markup Language) or OIDC (OpenID Connect) type.

Delegating authentication to identity providers may pose a problem with regard to the protection of personal data. Indeed, these solutions require the user to share numerous personal data beforehand with the one or more identity providers. A malicious party offering such a service could retrieve sensitive user data and sell them on without users being aware of it. In addition, the user has no control over the amount and the nature of the information communicated to the digital services by the identity provider during authentication requests.

4. SUMMARY OF THE INVENTION

The invention aims to improve the prior art and proposes a method for authenticating a user with at least one application, called service application, said user being equipped with a user device having at least one address and being able to obtain at least one authentication datum for said user, the method being implemented by an authentication device for authenticating a user and characterized in that it comprises:
  a step of receiving, from said at least one service application, a request comprising at least one identifier of said user;
  a first step of sending, to an application registered in a blockchain, a request comprising said at least one identifier of said user;
  a second step of receiving, in response to the sending step, a message comprising at least one first datum corresponding to a first address of said user device, said at least one first datum having been obtained based on said at least one identifier of said user;
  a second step of sending, to said first address, a request to send a message comprising said at least one authentication datum for said user to an address of said service application.

The service provider who wishes to authenticate a user will thus call upon the authentication device by sharing with it an identifier entered for example by the user on the human-machine interface of the service. The authentication device will then retrieve, from an application registered in a blockchain, an address of a device belonging to the user. This user device is for example a USB security key, a mobile, a PC, a virtual machine located in the network, or any other terminal able to obtain and provide data, for example encrypted data, of a user allowing him to be authenticated, such as for example authentication tokens. Once the address of the user device has been retrieved, the method will contact the user device via a redirection request redirecting to the address of the service that wishes to authenticate the user. During the redirection, the user's device completes the request with an authentication datum such as an authentication token. The token may for example be generated by the user device based on data entered by the user, such as biometric data.

A service application is understood to mean any application able to render at least one service for the needs of a user and executed for example on a server located in a network such as the Internet. The application may also be executed on a terminal such as for example a connected object, a smartphone, a personal computer, or any other terminal able to execute a computer application.

Advantageously, this method makes it possible to guarantee the identity of the user through the use of the blockchain. It will be recalled, as indicated in the document (https://en.wikipedia.org/wiki/Blockchain), that blockchain technology is a technology for storing and transmitting information without central control. Technically, a blockchain is a distributed database the information of which is submitted by users, and links internal to the database are verified and grouped at regular time intervals into blocks, all of these being secured by cryptography, and thus forming a chain. By extension, a blockchain is a distributed database that manages a list of records protected against tampering or modification by storage nodes; it is therefore a distributed and secure register of all the transactions carried out since the start of the distributed system. Blockchains are furthermore characterized in that their contents cannot be modified or deleted: information published in a blockchain remains so forever. Information "published" in a blockchain denotes information recorded or saved therein.

According to one particular mode of implementation of the invention, a method as described above is characterized in that the first sending step is followed by:
  a third step of receiving, from said service application, a request for attributes of said user, said request comprising said at least one authentication datum and said at least one identifier of said user;
  a third step of sending, to a second address of a device of said user obtained based on said at least one identifier of said user, a request for attributes of said user;
  a fourth step of receiving a response to the request for attributes, the response comprising at least one attribute of said user;

a fourth step of sending, to said service application, a response to the request for attributes, the response comprising at least one second datum.

This mode of implementation of the invention makes it possible to provide, at the end of the authentication, at least one datum to the service provider, such as for example one or more attributes of the user, an error code, etc. needed for the correct functioning of the service. Advantageously, the embodiment allows the user to remain in control of the attributes that he shares with the service providers. He is able to ascertain the data requested by the service provider and knowingly agree or not agree to share them.

An attribute is understood to mean a personal datum of the user such as a surname, first name, telephone number, biometric fingerprint, postal address, e-mail address, age, profession, etc. The attribute may also be a multimedia object such as a photo, a video, a text document, etc.

According to one particular mode of implementation of the invention, a method as described above is characterized in that the fourth sending step is preceded by:

- a step of obtaining, from a trusted entity, at least one third datum obtained by applying a function to said at least one attribute of said user;
- a step of generating at least one fourth datum obtained by applying said function to said at least one attribute of said user received in the fourth reception step;
- a step of adding said at least one attribute of said user to the content of said at least one second datum based on the result of the comparison of said at least one third datum with said at least one fourth datum.

This embodiment makes it possible to ensure that the attributes of the user are valid. The device will for example obtain, from a trusted entity, a hash (digital fingerprint used to quickly identify an initial datum produced via a function that takes the datum at input) of the attribute of the user and compare it with the hash of the attribute of the user generated by the authentication device itself. If the two hashes match, then the received attributes are considered to be valid. They are then inserted into the data sent by the authentication method to the service application. Trusted entity is the name given to a device such as a server, a personal computer, a mobile terminal, a connected object able to obtain, for example from a user, and to provide certified data such as attributes of a user.

According to one particular mode of implementation of the invention, a method as described above is characterized in that the trusted entity is an application registered in a blockchain. This embodiment makes it possible to ensure that the proofs have not been corrupted, since the data written to a blockchain cannot be modified or deleted.

According to one particular mode of implementation of the invention, a method as described above is characterized in that said first address corresponds to said second address of said user device.

This embodiment makes it possible to use the same user terminal to retrieve the one or more authentication data and the one or more attributes.

According to one particular mode of implementation of the invention, a method as described above is characterized in that said at least one attribute is an encrypted datum and in that the generation step is preceded by a step of decrypting said at least one attribute.

This embodiment allows the user not to transmit his attributes or personal data in unencrypted form.

The invention also relates to an authentication device for authenticating a user with at least one application, called service application, said user being equipped with a user device able to obtain at least one authentication datum for said user, and characterized in that it comprises:

- a reception module for receiving a request from said at least one service application comprising at least one identifier of said user;
- a sending module for sending, to an application registered in a blockchain, a request comprising said at least one identifier of said user;
- a second reception module for receiving a response message, from said application registered in a blockchain, comprising at least one first datum corresponding to a first address of said user device, said at least one first datum having been obtained based on said at least one identifier of said user;
- a second sending module for sending, to said first address, a request to send a message, to an address of said service application, comprising said at least one authentication datum for said user.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to a server, characterized in that it comprises an authentication device for authenticating a user as described above.

The invention also relates to a computer program comprising instructions for implementing the above method according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This authentication device for authenticating a user and this computer program have features and advantages analogous to those described above in relation to the method for authenticating a user.

5. LIST OF THE FIGURES

Other features and advantages of the invention will become more clearly apparent on reading the following description of particular embodiments, which are given by way of simple illustrative and non-limiting examples, and the appended drawings, in which.

6. DESCRIPTION OF ONE EMBODIMENT OF THE INVENTION

Figure 1:
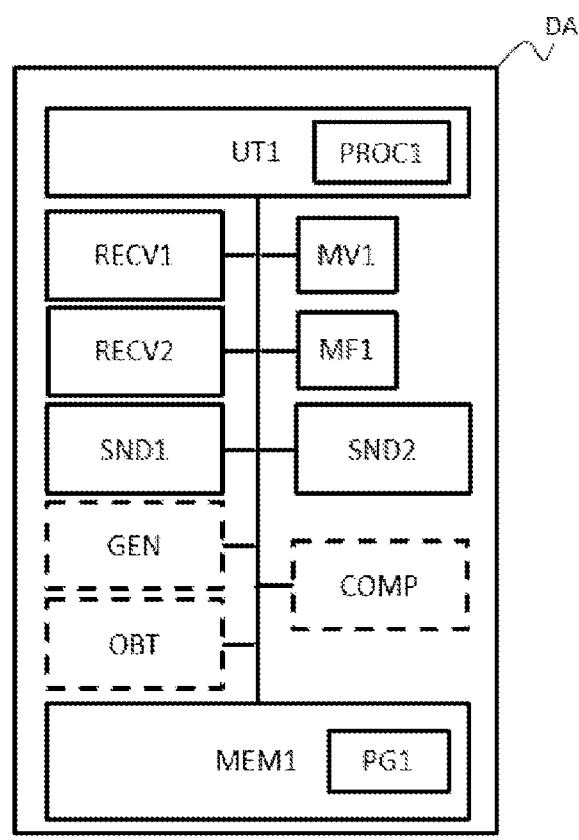
FIG. 1 shows the hardware architecture of an authentication device according to one particular embodiment of the invention.

FIG. 1 shows the hardware architecture of an authentication device DA according to the invention. In the embodiment described here, this device has the hardware architecture of a computer. It comprises in particular a processor PROC1, a random-access memory MV1, a read-only memory MEM1 and a non-volatile flash memory MF1. Such means are known per se and are not described in more detail here. The read-only memory is a recording medium according to the invention, which is able to be read by the processor PROC and on which there is recorded here a computer program PG1 according to the invention, this program comprising instructions for implementing the steps of the method for authenticating a user such as described above when the program is executed by the processor PROC1. On initialization, the code instructions of the computer program PG1 are for example loaded into a memory, before being executed by the processor PROC1. The processor PROC1 of the processing unit UT1 in particular implements the steps of the method for authenticating a user according to any one of the particular embodiments described with reference to FIG. 2, according to the instructions of the computer program PG1.

The device DA also comprises reception modules RECV1 and RECV2 able to receive communications via for example an IP and/or circuit-switched network. The reception module RECV1 is for example used to receive requests from a service application comprising at least one identifier of a user. The reception module RECV2 is for example used to receive a message comprising at least one datum corresponding to an address of a device of a user.

According to one particular embodiment of the invention, the modules RECV1 and RECV2 may be one and the same reception module.

The device DA furthermore comprises sending modules SND1 and SND2 able to send communications via for example an IP and/or circuit-switched network. The sending module SND1 is for example used to send, to an application registered in a blockchain, a request comprising at least one identifier of a user. The module SND2 is for example used to send, to an address of a user device, a request allowing the sending of a message, to an address of a service application, comprising at least one authentication datum for a user.

According to one particular embodiment of the invention, the modules SND1 and SND2 may be one and the same sending module.

According to one particular embodiment of the invention, the modules RECV1, RECV2, SND1 and SND2 may be one and the same communication module COM1 (not shown).

According to one particular embodiment of the invention, the communication module COM1 may also be used to receive, from a service application, a request for attributes of a user and comprising at least one authentication datum and an identifier of the user.

According to one particular embodiment of the invention, the communication module COM1 may also be used to send, to an address of a device of the user, a request for attributes of the user, the address of the device having been obtained based on a user identifier, for example via an application registered in a blockchain or from a digital storage space such as a database, a file or a memory. The communication module COM1 may also be used to receive a response to the request for attributes, the response comprising at least one attribute of the user or a status message, such as an error code.

According to one particular embodiment of the invention, the communication module COM1 may also be used to send, to a service application, a response to the request for attributes from the service application, comprising at least one datum such as an error code, a status, a transaction identifier, an attribute, etc.

According to one particular embodiment of the invention, the device DA comprises an obtainment module (OBT) able to obtain, from a trusted entity, at least one datum, called proof, obtained by applying a function F1 to one or more attributes of the user. The function F1 is for example a function for creating a hash and/or a function for encryption and/or a function for signing the one or more attributes of the user. It may be executed for example by the trusted entity or else by a user device or any other device able to provide the one or more proofs to the trusted entity.

According to one particular embodiment of the invention, the device DA comprises a generation module (GEN) able to generate the one or more proofs by applying the function F1 to one or more attributes of the user received via the module COM1. The one or more proofs generated may then be compared, by the comparison module (COMP), with the proofs obtained via the obtainment module OBT. If the result of the comparison is positive, then the attributes are considered to be valid. If not, the attributes are considered to be invalid.

According to one particular embodiment of the invention, the device DA comprises a module (not shown) for decrypting the obtained proofs. This embodiment makes it possible for example to decrypt the obtained proofs before being able to compare them with the proofs generated by the device DA.

According to one particular embodiment of the invention, the modules COM1 and OBT may be one and the same communication module.

Figure 2:
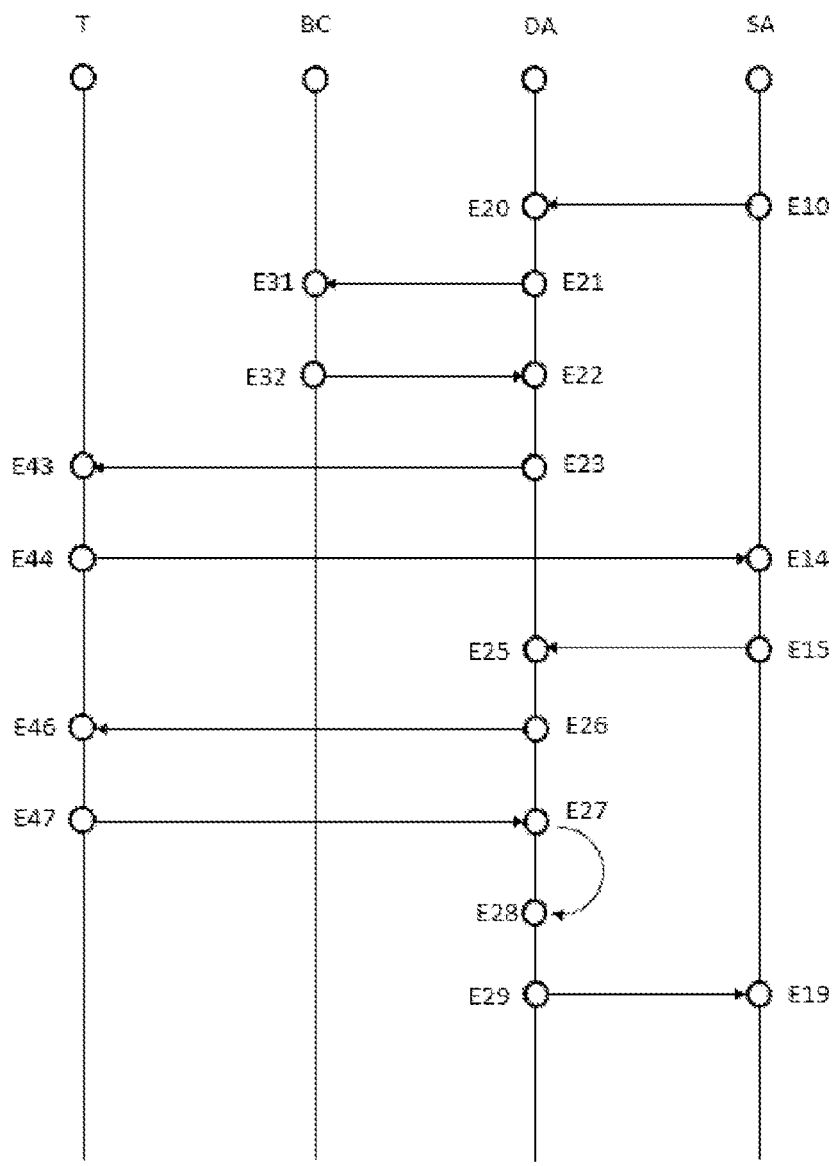
FIG. 2 shows the main steps of an authentication method according to one particular embodiment of the invention, in the form of a flowchart.

With reference to FIG. 2, a description will now be given of the main steps E20, E21, E22, E23, E25, E26, E27, E28 and E29 of an authentication method according to some embodiments of the invention.

FIG. 2 consists of a terminal T such as for example a mobile terminal, a USB (Universal Serial Bus) key, a connected object or a computer able to obtain and provide data, for example encrypted data, of a user allowing him to be authenticated, such as for example authentication tokens or personal data. FIG. 2 also comprises a device BC registered in a blockchain, for example able to execute decentralized functions or DApps in the sense of blockchain technology, but also a device SA such as a server, a personal computer, a connected object or any other terminal able to provide a service to a user. It also consists of a device DA able to execute the authentication method in the sense of the invention.

In a first step E10, the device SA sends an authentication request to the device DA. This request follows a request sent by a terminal of a user to access a service provided by the device DA. In step E20, the authentication device DA receives the authentication request, which may comprise multiple parameters such as an identifier of the user wishing to access the service provided by the device SA, a transaction number, a service identifier, an identifier of the device SA, an address of the device SA, a time range, or any other information related to the service or to the user.

In step E21, the authentication method will send, to the device BC, a request comprising at least one identifier of the user retrieved in step E20. The request is then received by the device BC in step E31.

In step E32, the device BC will return, to the device DA, a response containing an address, such as for example a MAC address or an IP address, of a terminal T belonging to the user. The address of the terminal T corresponds to a first datum in the sense of the invention. This address is selected by the device BC based on the identifier of the user received in step E31.

According to one particular embodiment of the invention, the device BC may send a response comprising a list of addresses of devices of the user, this list possibly for example being ordered, the first address being for example the one to be used by default. The addresses may also be associated with a datum indicating the nature of the data that it is possible to obtain via each user device (authentication datum, user attributes, etc.).

The response from the device BC is then received by the device DA in step E22. Once the address of the terminal T has been received by the device DA, said device DA will send (E23), to the address of the terminal T, a redirection request, that is to say a request asking the terminal T to in turn send a message to the device SA. The request sent by the device DA in step E23 and received by the terminal T in step E43 may comprise parameters such as the identifier of the service provided by the device SA and/or the address of the device SA and/or any other information such as a parameter provided by the device SA and received by the device DA in step E20. The message sent by the terminal T in step E44 and received by the device SA in step E14 comprises at least one authentication datum for the user, such as for example a personal datum or an authentication token.

It should be noted that the authentication data may be generated on the terminal T via for example data collected by a biometric sensor used to obtain a fingerprint, an iris, a face, a voice, etc. of the user.

According to one particular embodiment of the invention, the authentication datum may vary based on one or more parameters, for example received by the terminal T in step E43 and/or obtained by the terminal T, such as for example the current time obtained via a clock internal to the device T. If one of the parameters is a parameter of the request received in step E43, this may be a parameter previously received by the device DA in step E20, such as a time range, an identifier of the service or of the device SA.

According to one particular embodiment of the invention, the device SA sends, in step E15, a request for attributes of the user to the device DA. The request comprises at least one authentication datum received by the device SA in step E14 and an identifier of the user, which is for example the same as the one transmitted in the request sent by the device SA in step E10. It may also comprise other parameters such as a service identifier of a service executed by the device SA, a transaction number, an identifier of the device SA, or any other information related to the service. The device DA receives the request in step E25 and, in step E26, will send a request for attributes to a device of the user. This request for attributes may comprise parameters received from the device SA in step E25. The request is received in step E46 by the user device, which is the terminal T in the case described with reference to FIG. 2.

According to one variant of this particular mode of implementation, the user device that receives the attribute request (E46) may be different from the user device that receives the redirection request (E43).

In step E47, the terminal T transmits, to the device DA, one or more attributes of the user. The attributes are for example dependent on a service identifier, a transaction number, an identifier of the device SA, or any other information related to the service and received in step E46. The device DA receives the one or more attributes of the user in step E27, and will then transmit it or them to the device SA in step E29. The one or more attributes are then received by the device SA in step E19.

According to one particular embodiment of the invention, the device DA may, after having retrieved the attributes of the user (E27), decrypt the attributes, via for example a key shared with the terminal T, before transmitting them to the device SA (E29).

According to one particular embodiment of the invention, the device DA may, after having retrieved the attributes of the user (E27), check the signature of the attributes, via for example a key shared with the terminal T, before transmitting them to the device SA (E29).

The processes of encrypting and/or signing attributes using keys shared between the terminal T and the device DA are processes known from the prior art and are therefore not described in more detail here.

According to one particular embodiment of the invention, the device DA may obtain, from a trusted entity (not shown), one or more hashes of an attribute, of multiple attributes or of a concatenation of attributes of the user. The device DA will then compute the hash of an attribute, of multiple attributes or of a concatenation of attributes retrieved from the user in step E27 by applying the same function as the one that made it possible to generate the one or more hashes obtained from the trusted entity. The device will then, in step E28, compare the one or more computed hashes with those obtained from the trusted entity. If the result of the comparison is positive, then the attributes are considered to be valid. If not, the attributes are considered to be invalid and an error message, such as for example a code, is returned to the device SA in step E29.

It goes without saying that the embodiment that has been described above has been given purely by way of indication and with no limitation whatsoever, and that many modifications may easily be made thereto by those skilled in the art without, however, departing from the scope of the invention.

The invention claimed is:

1. A method for authenticating a user with at least one application, called service application, said user being equipped with at least one user device, the method being implemented by an authentication device for authenticating the user and comprises:
 a step of receiving, from said at least one service application, a request comprising at least one identifier of said user;
 a first step of sending, to an application registered in a blockchain, a request comprising said at least one identifier of said user;
 a second step of receiving, in response to the first sending step, a message comprising at least one first datum corresponding to a first address of a first user device of said at least one user device, said at least one first datum having been obtained based on said at least one identifier of said user; and a second step of sending, to said first address of the first user device, a request to send a message comprising at least one authentication datum for said user to an address of said service application.

2. The authentication method as claimed in claim 1, wherein the first sending step is followed by:

a third step of receiving, from said service application, a request for attributes of said user, said request for attributes comprising said at least one authentication datum and said at least one identifier of said user;

a third step of sending, to a second address of a second user device of the at least one user device obtained based on said at least one identifier of said user, said request for attributes of said user;

a fourth step of receiving, from said second user device, a response comprising at least one attribute of said user;

a fourth step of sending, to said service application, at least one second datum comprising said at least one attribute of said user.

3. The authentication method as claimed in claim 2, wherein the fourth step of sending is preceded by:

a step of obtaining, from a trusted entity, at least one third datum;

a step of generating at least one fourth datum obtained by applying a cryptographic function to said at least one attribute of said user received in the fourth receiving step;

a step of adding said at least one attribute of said user to a content of said at least one second datum based on a result of a comparison of said at least one third datum with said at least one fourth datum.

4. The authentication method as claimed in claim 3, wherein the trusted entity is an application registered in a blockchain.

5. The authentication method as claimed in claim 3, wherein said at least one attribute comprises an encrypted datum and the step of generating is preceded by a step of decrypting said at least one attribute.

6. The authentication method as claimed in claim 2, wherein said first and second user devices are the same user device and said first address corresponds to said second address.

7. An authentication device for authenticating a user with at least one application, called a service application, said user being equipped with at least one user device, and wherein the authentication device comprises:

a processor; and a non-transitory computer readable medium comprising instructions stored thereon which when executed by the processor configure the authentication device to implement:

a step of receiving a request from said at least one service application comprising at least one identifier of said user;

a first step of sending, to an application registered in a blockchain, a request comprising said at least one identifier of said user;

a second step of receiving a response message, from said application registered in the blockchain, comprising at least one first datum corresponding to a first address of a first user device of said at least one user device, said at least one first datum having been obtained based on said at least one identifier of said user;

a second step of sending, to said first address of the first user device, a request to send a message, to an address of said service application, comprising at least one authentication datum for said user.

8. A server comprising the authentication device as claimed in claim 7.

9. The authentication device as claimed in claim 7, wherein the instructions further configure the authentication device to implement, following the first sending step:

a third step of receiving, from said service application, a request for attributes of said user, said request for attributes comprising said at least one authentication datum and said at least one identifier of said user;

a third step of sending, to a second address of a second user device of the at least one user device obtained based on said at least one identifier of said user, said request for attributes of said user;

a fourth step of receiving, from said second user device, a response comprising at least one attribute of said user;

a fourth step of sending, to said service application, at least one second datum comprising said at least one attribute of said user.

10. The authentication device as claimed in claim 9, wherein the instructions further configure the authentication device to implement, preceding the fourth step of sending:

a step of obtaining, from a trusted entity, at least one third datum;

a step of generating at least one fourth datum obtained by applying a cryptographic function to said at least one attribute of said user received in the fourth receiving step;

a step of adding said at least one attribute of said user to a content of said at least one second datum based on a result of a comparison of said at least one third datum with said at least one fourth datum.

11. The authentication device as claimed in claim 10, wherein the trusted entity is an application registered in a blockchain.

12. The authentication device as claimed in claim 10, wherein said at least one attribute comprises an encrypted datum and wherein the instructions further configure the authentication device to implement, preceding the step of generating, a step of decrypting said at least one attribute.

13. The authentication device as claimed in claim 9, wherein said first and second user devices are the same user device and said first address corresponds to said second address.

14. A non-transitory computer readable medium comprising a computer program stored thereon comprising instructions for implementing a method for authenticating a user with at least one application, called service application, when the program is executed by a processor of an authentication device, said user being equipped with at least one user device, wherein the method comprises:

a step of receiving, from said at least one service application, a request comprising at least one identifier of said user;

a first step of sending, to an application registered in a blockchain, a request comprising said at least one identifier of said user;

a second step of receiving, in response to the first sending step, a message comprising at least one first datum corresponding to a first address of a first user device of said at least one user device, said at least one first datum having been obtained based on said at least one identifier of said user; and a second step of sending, to said first address of the first user device, a request to send a message comprising at least one authentication datum for said user to an address of said service application.

\* \* \* \* \*